(12) United States Patent
Wang et al.

(10) Patent No.: US 9,135,411 B2
(45) Date of Patent: Sep. 15, 2015

(54) DIGITAL RIGHTS MANAGEMENT APPARATUS AND METHOD

(75) Inventors: Pang-Chieh Wang, Kaohsiung (TW); Shu-Fen Yang, Guanxi Township, Hsinchu County (TW); Jun-Bin Shi, Dounan Town (TW); Ko-Li Kan, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 94 days.

(21) Appl. No.: 13/352,940

(22) Filed: Jan. 18, 2012

(65) Prior Publication Data

US 2013/0041991 A1 Feb. 14, 2013

(30) Foreign Application Priority Data

Aug. 8, 2011 (TW) .............................. 100128236 A

(51) Int. Cl.
  *G06F 15/173* (2006.01)
  *G06F 21/10* (2013.01)
  *H04N 21/4627* (2011.01)

(52) U.S. Cl.
  CPC .............. *G06F 21/10* (2013.01); *G06F 15/173* (2013.01); *H04N 21/4627* (2013.01)

(58) Field of Classification Search
  None
  See application file for complete search history.

(56) References Cited

U.S. PATENT DOCUMENTS

| | | | |
|---|---|---|---|
| 5,898,834 A * | 4/1999 | Sharpe et al. | 709/201 |
| 6,668,324 B1 | 12/2003 | Mangold et al. | |
| 6,915,278 B1 * | 7/2005 | Ferrante et al. | 705/59 |
| 7,055,039 B2 | 5/2006 | Chavanne et al. | |
| 7,120,250 B2 | 10/2006 | Candelore | |
| 7,225,161 B2 | 5/2007 | Lam et al. | |
| 7,277,548 B2 | 10/2007 | Park et al. | |
| 7,333,616 B1 | 2/2008 | Brettle et al. | |
| 7,467,287 B1 | 12/2008 | Bratt et al. | |
| 7,480,385 B2 | 1/2009 | Weber | |

(Continued)

FOREIGN PATENT DOCUMENTS

| | | |
|---|---|---|
| CN | 1934518 | 3/2007 |
| CN | 101196971 A | 6/2008 |

(Continued)

OTHER PUBLICATIONS

English language translation of abstract of TW 200604775 (published Feb. 1, 2006).

(Continued)

*Primary Examiner* — Joshua Joo
*Assistant Examiner* — Younes Naji
(74) *Attorney, Agent, or Firm* — McClure, Qualey & Rodack, LLP

(57) ABSTRACT

A digital rights management (DRM) apparatus and a DRM method are disclosed. The DRM apparatus includes a DRM packer, a DRM object database, a distribution manager, a tracking recording unit, and an index controller. The DRM packager generates M content objects according to a digital content and outputs M DRM objects. The DRM object database stores the M DRM objects. The distribution manager selects N DRM objects according to request information from a client. M and N are positive integers, and N is less than M. The index controller controls the distribution manager to transmit N content objects to the client according to the tracking record, index information, a control rule, and a rights datum.

19 Claims, 6 Drawing Sheets

(56) References Cited

U.S. PATENT DOCUMENTS

| | | | |
|---|---|---|---|
| 7,555,464 | B2 | 6/2009 | Candelore |
| 7,580,894 | B2 * | 8/2009 | Vataja et al. ................... 705/51 |
| 7,644,044 | B2 | 1/2010 | Candelore |
| 7,748,044 | B2 | 6/2010 | Kuo et al. |
| 7,845,014 | B2 | 11/2010 | Siegel |
| 7,885,896 | B2 * | 2/2011 | Lenard et al. .................. 705/59 |
| 8,029,367 | B2 * | 10/2011 | Ostergren et al. ............... 463/42 |
| 8,275,716 | B2 * | 9/2012 | Lao ................. 705/51 |
| 8,290,873 | B2 * | 10/2012 | Issa et al. ........................ 705/54 |
| 8,296,302 | B2 * | 10/2012 | Qiu ............................... 707/739 |
| 2002/0198846 | A1 | 12/2002 | Lao |
| 2004/0088558 | A1 | 5/2004 | Candelore |
| 2004/0196972 | A1 | 10/2004 | Zhu et al. |
| 2005/0187879 | A1 * | 8/2005 | Zigmond et al. ................ 705/59 |
| 2005/0190911 | A1 | 9/2005 | Pare et al. |
| 2005/0192904 | A1 | 9/2005 | Candelore |
| 2006/0031873 | A1 | 2/2006 | Fahrny |
| 2006/0101524 | A1 | 5/2006 | Weber |
| 2006/0159266 | A1 | 7/2006 | Chavanne et al. |
| 2006/0274898 | A1 | 12/2006 | Pedlow |
| 2007/0038873 | A1 | 2/2007 | Oliveira et al. |
| 2007/0116287 | A1 | 5/2007 | Rasizade et al. |
| 2007/0116288 | A1 | 5/2007 | Rasizade et al. |
| 2007/0242829 | A1 | 10/2007 | Pedlow |
| 2008/0155646 | A1 * | 6/2008 | Lee ................................... 726/1 |
| 2008/0184334 | A1 | 7/2008 | Hebert et al. |
| 2008/0270308 | A1 | 10/2008 | Peterka et al. |
| 2008/0310292 | A1 | 12/2008 | Nagai et al. |
| 2009/0041237 | A1 | 2/2009 | Takashima et al. |
| 2009/0138714 | A1 | 5/2009 | Matsushita et al. |
| 2009/0183149 | A1 * | 7/2009 | Milne et al. ................... 717/171 |
| 2009/0328228 | A1 | 12/2009 | Schnell |
| 2010/0008509 | A1 | 1/2010 | Matsushita et al. |
| 2010/0100551 | A1 | 4/2010 | Knauft et al. |
| 2010/0185854 | A1 | 7/2010 | Burns et al. |
| 2010/0333209 | A1 | 12/2010 | Alve |
| 2011/0178930 | A1 | 7/2011 | Scheidt et al. |
| 2012/0063592 | A1 | 3/2012 | Spalka et al. |
| 2012/0159644 | A1 | 6/2012 | Rasizade et al. |
| 2012/0278446 | A1 * | 11/2012 | Darcie et al. .................. 709/219 |
| 2013/0124868 | A1 | 5/2013 | Sorotokin et al. |

FOREIGN PATENT DOCUMENTS

| | | | |
|---|---|---|---|
| CN | 200910162146 | * | 8/2009 |
| CN | 101609495 | * | 12/2009 |
| CN | 102118391 A | | 7/2011 |
| TW | 200604775 | | 2/2006 |
| TW | I269991 B | | 1/2007 |
| TW | I270284 | | 1/2007 |
| TW | 200727654 | | 7/2007 |
| TW | I315629 | | 10/2009 |
| TW | 201020947 | | 6/2010 |

OTHER PUBLICATIONS

English language translation of abstract of TW I270284 (published Jan. 1, 2007).

English language translation of abstract of CN 1934518 (published Mar. 21, 2007).

English language translation of abstract of TW 200727654 (published Jul. 16, 2007).

English language translation of abstract of TW 201020947 (published Jun. 1, 2010).

Kang, S., et al.; "A Multiple Data Embedding Technique for DRM using Fresnel Transform;" IEEE; 2005; pp. 2174-2177.

Chang, K.A., et al.; "Multimedai Rights Management for the Multiple Devices of End-User;" Proceedings of the 23rd International Conference on Distributed Computing Systems Workshops; IEEE: 2003; pp. 1-6.

Jeong, E.S., et al.; "A New DRM System Based on Graded Contents Sharing and Time-Block Distribution for Home Networks;" 6th IEEE/ACIS International Conference on Computer and Information Science; 2007; pp. 1-4.

Ma, G., et al.; "A Digital Rights Management Scheme based on Rational Share Content;" IEEE; 2010; pp. 517-520.

Allasia, W., et al.; "An Innovative Approach for Indexing and Searching Digital Rights;" Third International Conference on Automated Production of Cross Media Content for Multi-channel Distribution; IEEE 2007; pp. 147-154.

Non-Final Office Action for U.S. Appl. No. 13/438,943, filed Apr. 4, 2012, mailed Sep. 10, 2013.

Final Office Action for U.S. Appl. No. 13/438,943, filed Apr. 4, 2012, mailed Dec. 20, 2013.

TW Office Action dated Apr. 14, 2014.

English Abstract translation of TWI269991 (Published Jan. 1, 2007).

Full English (machine) translation of CN101196971 (Published Jun. 11, 2008).

Full English (machine) translation of CN102118391 (Published Jul. 6, 2011).

Xiao Zhang: "A Survey of Digital Rights Management Technologies," (last modified: Nov. 28, 2011); pp. 1-10.

* cited by examiner

DIGITAL RIGHTS MANAGEMENT APPARATUS AND METHOD

This application claims the benefit of Taiwan application Serial No. 100128236, filed Aug. 8, 2011, the subject matter of which is incorporated herein by reference.

BACKGROUND

1. Technical Field

The disclosure relates to a digital rights management apparatus.

2. Description of the Related Art

With the popularization and diversification of the service of the digital content, the digital rights management is being generally applied to each electronic product or internet service. The purpose of the digital rights management is to protect the spread of the digital content from infringement by way of copy or use at will and define the commercial operation mode according to the form of the digital content and the function of the related electronic products. Current digital rights system mostly combines the online paying system into a complete digital online service.

Open Mobile Alliance (OMA) integrates plenty of service standard organizations (such as WAP forum, Wireless Village, SyncML, LiF, and so on) of the field, and aims to develop joint open standards for conforming to the market demand and helping to establish the compatible and interactive services working across nations, operators, and mobile terminals. Currently Open Mobile Alliance has already developed as a global standard organization including more than 350 members. There are 15 work teams such as Requirements, Architecture, Security, Interoperability, Browser & Content, Location, Push to talk over cellular, and so on set up in OMA, developing different standards for the application layer with respect to different value-added services.

While there are different DRM systems working online, Open Mobile Alliance has also defined a standard of DRM. The latest version is OMA DRM 2.1. Each of the standard of OMA and the different DRM systems defines the related rights of the digital content that a user purchases and encrypts the delivered digital content, and the delivered digital content is allowed to be used by the authorized users and apparatus only.

However, a user could have a plenty of apparatus used in different conditions, for example, the home computer, the notebook computer, handheld device, and so on. Therefore, each DRM system defines a domain or a mechanism similar to domain. A user can define his/her own devices as being in the same domain, which enables the user to download or copy or use the content at will in plenty of devices after buying the digital content one time. Certainly, an apparatus can only belong to one domain, and the quantity of the apparatuses in the domain is limitary. As such, the corresponding relationship of the domain makes it more easily to spread the digital content. As compared with that the purchase of general software is to obtain the authorization with respect to a machine (apparatus), the use (or browsing) of the digital content is by a user. Therefore, the authorized object includes a user and one's own machine (apparatus) of the domain.

SUMMARY

The disclosure is directed to a digital rights management (DRM) apparatus and digital rights management method.

According to an embodiment, it is directed to a digital rights management apparatus which includes a digital rights management packer, a digital rights management object database, a distribution manager, a tracking record unit, and an index controller. The digital rights management packer generates a content object according to a digital content and outputs M digital rights management objects according to M content objects, a key datum, and a rights datum. The digital rights management objects database stores M digital rights management objects. The distribution manager selects corresponding N digital rights management objects according to request information from M digital rights management objects, wherein M and N are positive integers and N is less than M. The tracking record unit stores a tracking record. The index controller obtains index information and controls the distribution manager to transmit N content objects to the client according to the tracking record, the index information, a default control rule, and the rights datum, and recording the transmitted index information into tracking record. N should be less than a request upper limit value and the upper limit value of maximum quantity of content objects that is allowable for the client could request at once.

According to another embodiment, it is directed to a digital rights management method. The digital rights management method is for a digital rights management apparatus. The digital rights management apparatus includes a digital rights management packer, a digital rights management object database, a distribution manager, a tracking record unit for storing a tracking record, and an index controller, The digital rights management method comprises: generating a content object according to a digital content by the digital rights management packer and outputting M digital rights management objects according to M content objects, a key datum, and a rights datum; storing M digital rights management objects to the digital rights management object database; selecting corresponding N digital rights management objects according to a request information from M digital rights management objects, wherein M and N are positive integers which N is less than M; and an index controller obtaining index information, controlling the distribution manager to transmit N content objects to the client according to the tracking record, the index information, a default control rule, and the rights datum, and recording the transmitted index information to tracking record. N is less than a request upper limit value and the request upper limit value is a maximum quantity of content objects that is allowable for the client to request once.

The above and other embodiments of the disclosure will become better understood with regard to the following detailed description of the non-limiting embodiment(s). The following description is made with reference to the accompanying drawings.

DETAILED DESCRIPTION

Figure 1:
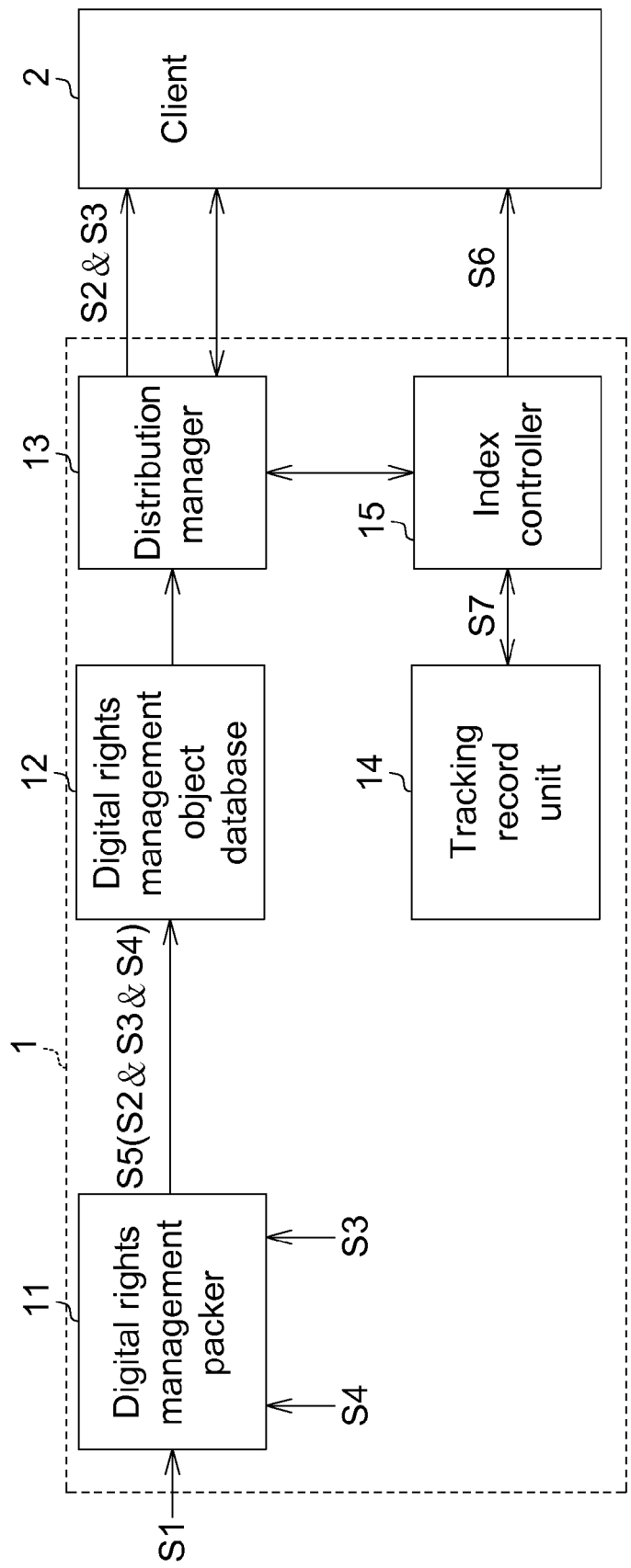
FIG. 1 is a schematic diagram showing digital rights management apparatus according to a first embodiment.
Figure 2:
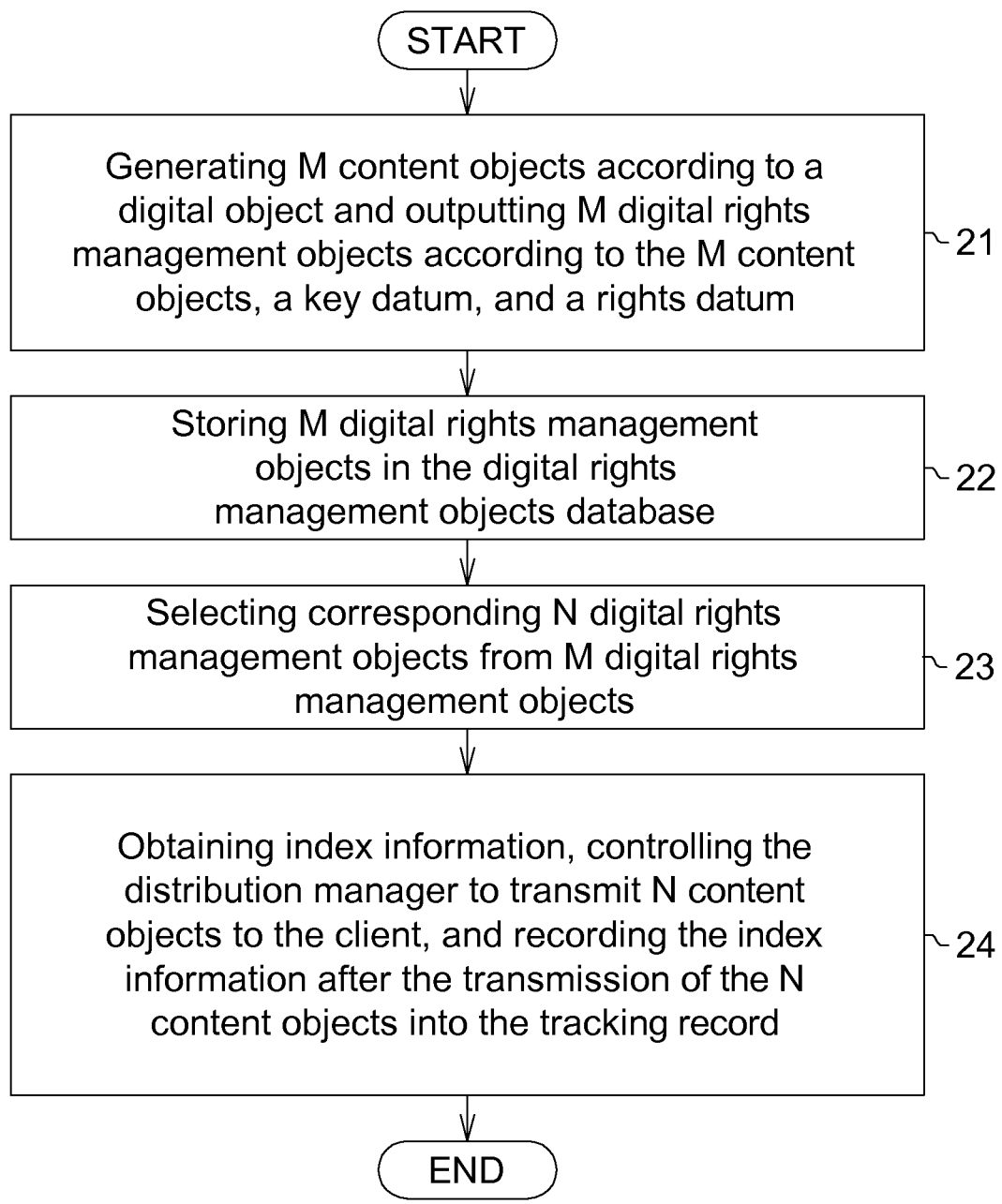
FIG. 2 is a schematic diagram showing a digital rights management system according to the first embodiment.
Figure 3:
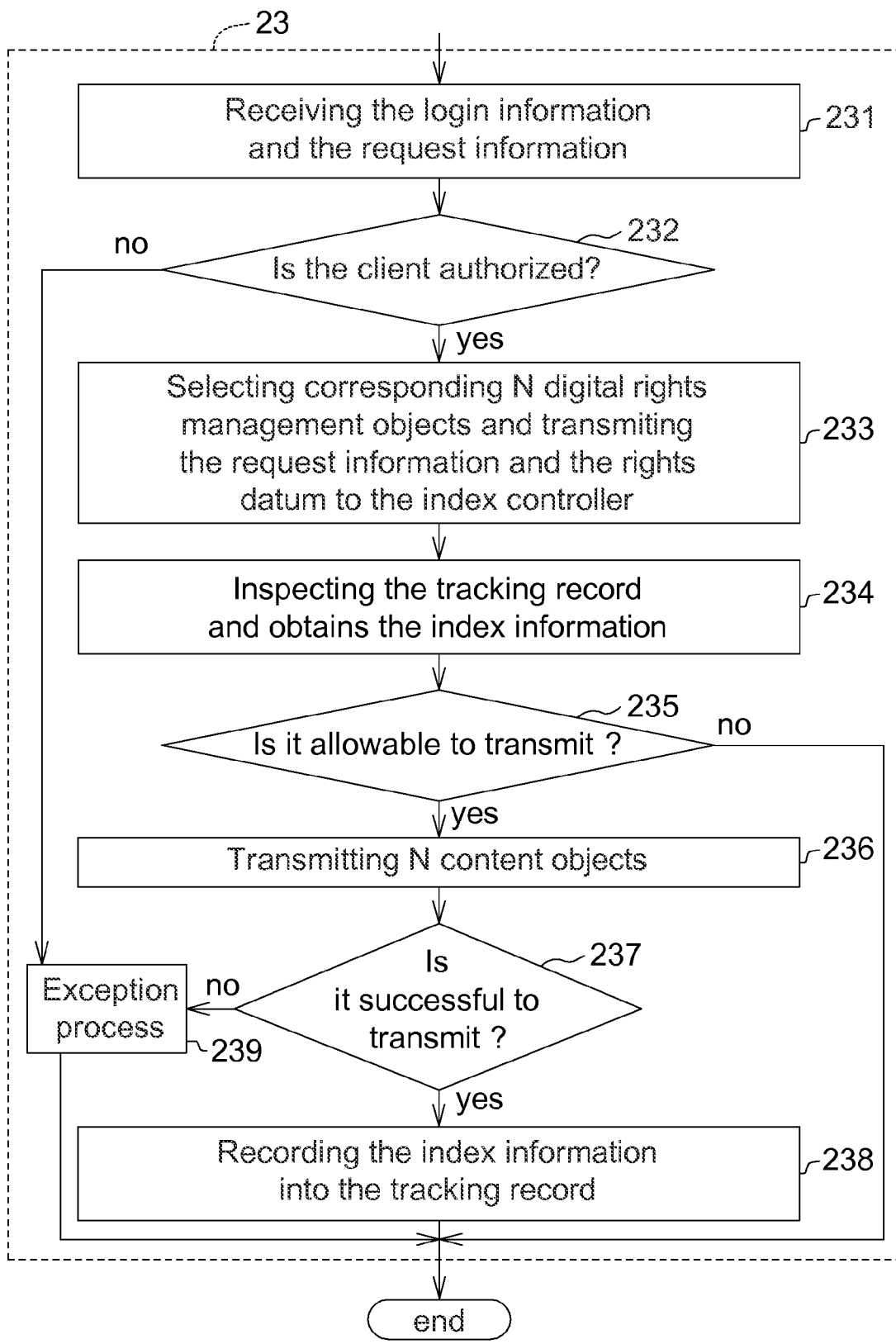
FIG. 3 is a flow chart showing a digital rights management method according to the first embodiment.

Referring to FIGS. 1, 2, and 3, FIG. 1 is a schematic diagram showing digital rights management apparatus according to a first embodiment, FIG. 2 is a schematic diagram showing a digital rights management system according to the first embodiment, and FIG. 3 is a flow chart showing a digital rights management method according to the first embodiment. The digital rights management apparatus includes a digital rights management packer 11, a digital rights management object database 12, a distribution manager 13, a tracking record unit 14, and an index controller 15. The tracking record unit 14 is for storing a tracking record S7; the tracking record S7 includes, for example, the information of the user, the information of the apparatus from the client, and the transmitted record of the content object. The digital rights management method can be used in the digital rights management apparatus and includes the following steps.

First, as shown in step 21, the digital rights management packer 11 generates M content objects S2 according to a digital content and outputs M digital rights management objects S5 according to M content objects S2, a key datum S3, and a rights datum S4. For example the data quantities of the M content objects S2 are different or the same. Moreover, the digital rights management packer 11 generates the M content objects according to the digital content S1 which the content issuer provides, and M digital rights management objects S5 according to the M content objects S2, a key datum S3, and a rights datum S4, which the rights issuer provides. Key datum S3 could include one or plenty of keys, and the digital content S1 could be for example the static literal, graph, dynamic image, voice, or the composition of two of them. The digital rights management packer 11 could segment the digital content on the basis of semantics from the context or the user's recognition of the paragraphs. For example, the digital rights management packer 11 segments the digital content S1 according to an article chapter, an article paragraph, or a graph. For another example, the digital rights management packer 11 segments the digital content S1 according to a plurality of graphs or paint frames. The digital rights management packer 11 encrypts the segmented digital content into the M content objects S2 according to the key datum S3, then the digital rights management packer 11 packs the M content objects S2, key datum S3, and rights datum S4 as M digital rights management objects S5.

As shown in step 22, the digital rights management packer 11 then stores M digital rights management objects S5 to a digital rights management database 12. After that, as shown in step 23, the distribution manager 13 selects corresponding N digital rights management objects from the M digital rights management objects S5 according to the request information from the client 2. N should be less than a request upper limit value and the request upper limit value is the maximum quantity of the content objects that is allowable for the client 2 to request once. M and N are positive integer, and N is less than M. Then, as shown in step 24, the index controller 15 obtains index information and controls the distribution manager 13 to transmit N content objects and corresponding key datum S3 to the client according to the tracking record S7, the index information S6, a default control rule, and the rights datum S4, and recording the transmitted index information to the tracking record. In addition, the distribution manager 13 can also return the latest condition for the digital content which the user reads in the client 2 back to the index controller 15. The N content objects S2 for example have different or the same quantity of data.

Further, the default control rule is for example that the quantity of the content objects which the client can download should be less than an upper limit value for content objects. In addition, for example, if the quantity of the content objects is greater than the upper limit value for content objects, the distribution manager 13 will first request the client 2 to delete the stored content object(s) before transmit the request content object to the client 2. For example, the preset upper limit value for content objects is three, and the client has downloaded two content objects S2 before. When the client 2 requests to transmit two more content objects S2, because it is more than the upper limit value, the distribution manager 13 first requests the client 2 to delete the two stored content objects originally and then transmits the two request content objects S2 and the two stored content objects are deleted.

In other examples, the default control rule is that the number of client that requests the transmission of N content objects S2, in a preset period of time, is less than an upper limit value for client. The upper limit value of the client can be flexibly adjusted, depending on the amount of the authorized users of the digital rights. For example, the upper limit value for client is one, which means the digital rights is authorized to a single user. The same user cannot request, by two clients, to transmit the N same content objects S2 in the same preset period time. That is to say that the control rule requires that the transmission of the N content objects S2 can be requested by only one user in the same preset time.

Referring to FIGS. 1 and 3, FIG. 3 is a detail flow chart of above-mentioned step 23. Step 23 for example includes steps 231 to 239. First, as shown in step 31, the distribution manager 13 receives the login information and the request information of the client 2. Then, as shown in step 232, the distribution manager 13 determines if the client 2 is authorized according to the login information. If the client 2 is not authorized, as shown in step 239, the distribution manager 13 executes an exception process, and then ends the process.

Conversely, if the client is authorized, then as shown in step 233, the distribution manager 13 selects corresponding N digital rights management objects according to the request information from digital rights management object database and then transmits the request information and the rights data of N digital rights management objects to the index controller. Then, as shown in step 234, the index controller 15 inspects the tracking record and obtains the index information. According to the tracking record, the index controller 15 can determine whether the client has downloaded any content object before and which content objects the client has downloaded before. The index controller 15 can determine which content object of the client is pointed to presently according to the index information S6. Next, step 235 shows that the index controller 15 further determines whether to allow the distribution manager 13 to transmit N content objects according to the rights datum S4, the index information S6, the request information, and the control rule. When the transmission of the N content objects is not allowed, the process ends. Conversely, when the transmission of the N content objects is allowed, as shown in step 236, the distribution manager transmits the N content objects to the control end 2.

Then, as shown in step 237, the distribution manager 13 determines if the transmission of the N content objects is successful. If the transmission of the N content objects is not successful, as shown in step 239, the distribution manager 13 executes an exception process, and then ends the process. Conversely, if the N content objects are successfully transmitted, as shown in step 238, the index information S6 is recorded into the tracking record.

Figure 4:
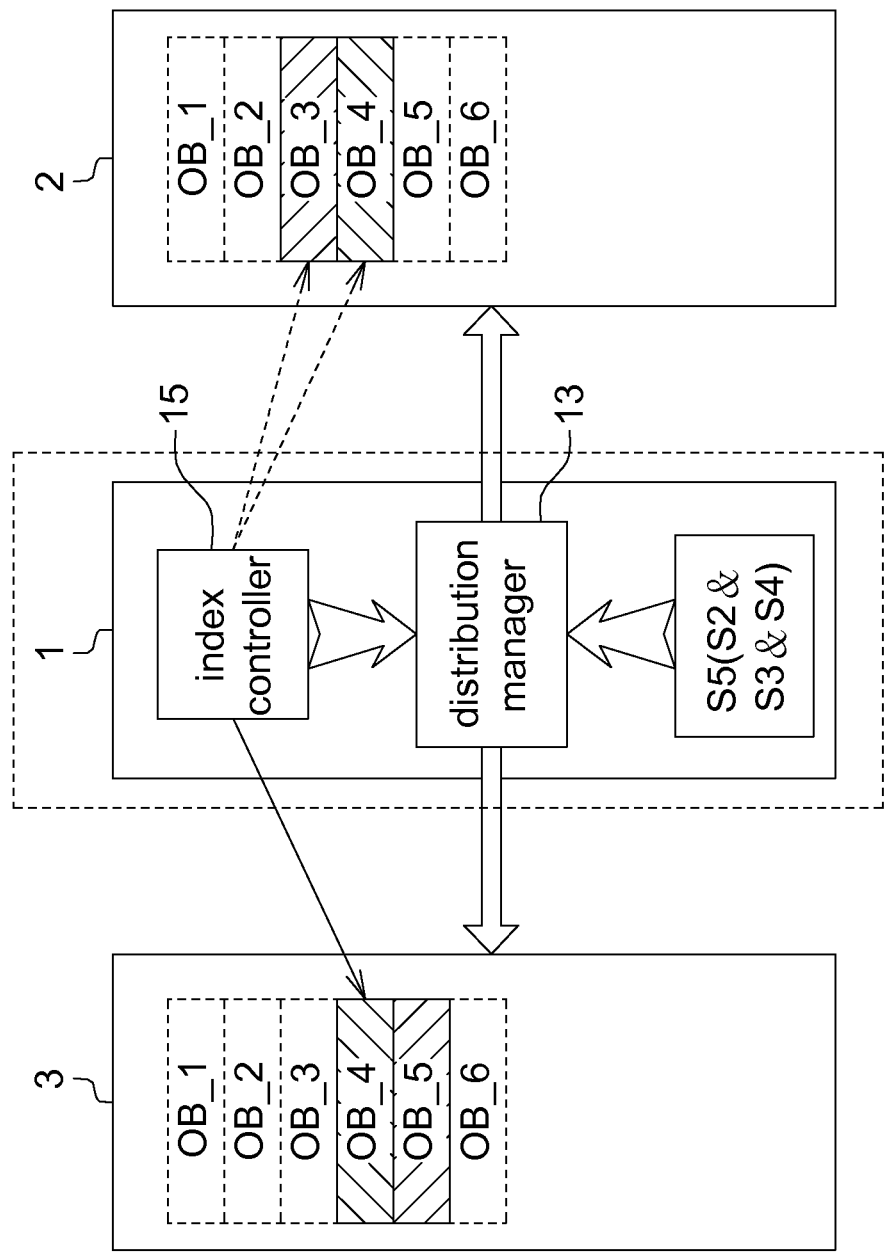
FIG. 4 is a schematic diagram showing the use of different clients to request the digital rights management apparatus to transmit a content object.

Referring to FIG. 4, a schematic diagram shows that using different clients to request the digital rights management apparatus to transmit content objects. For example, the user browses the same digital content S1 by the clients 2 and 3, respectively. The user first browses content objects OB1 to OB4 by the client 2. If the upper limit value for content objects is two, the distribution manager 13 will request the client 2 to delete the content objects OB1 to OB2 before to transmit content objects OB3 to OB4 when the client 2 requests the digital rights management apparatus 1 to transmit the content objects OB3 to OB4.

When the user changes to browsing the digital content S1 by the client 3, the index controller 15 controls the distribution manager 13 to transmit the content objects OB4 to OB5 only and not transmit the content objects OB1 to OB4 to the client 3. Then, the user can browse the same digital content by different client and would not result in the whole content or too many redundant contents stored in the same client.

Figure 5:
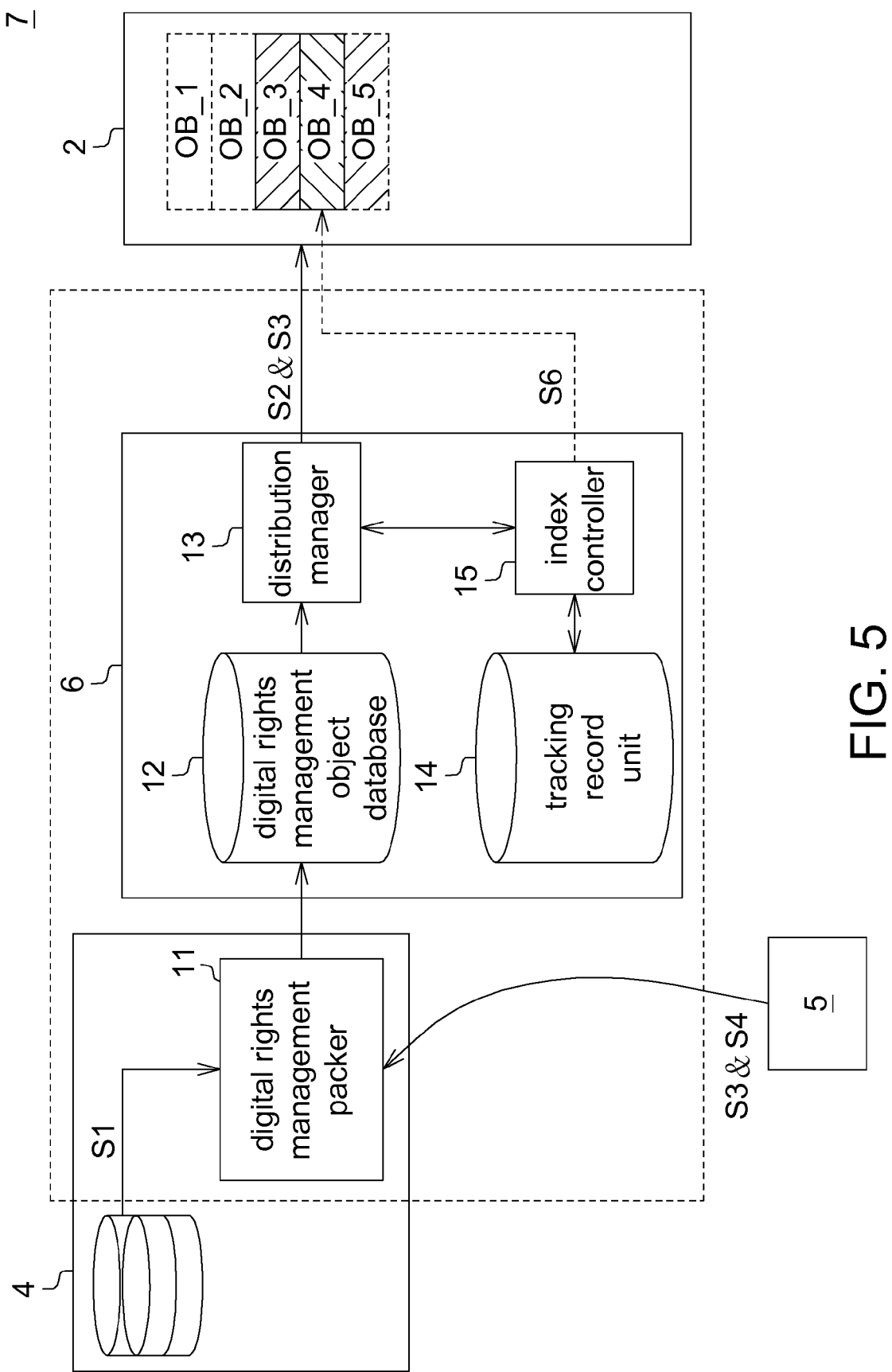
FIG. 5 is a schematic diagram showing a digital rights management system according to a second embodiment.

Referring to FIG. 5, FIG. 5 is a schematic diagram showing a digital rights management system according to the second embodiment of the disclosure. The digital rights management system 7 includes a content issuer 4, a rights issuer 5, and a distribution controller 6. The rights issuer 5 provides a key datum S3 and a rights datum S4 to the digital rights management packer 11 which generates M digital rights management objects S5 according to the digital content S1, the key datum S3, and the rights datum S4. The digital rights management packer 11 are included in a content issuer 4 and the digital rights management object database 12, the digital rights management 13, the tracking record unit 14, and the index controller 15 are included in a distribution controller 6.

Figure 6:
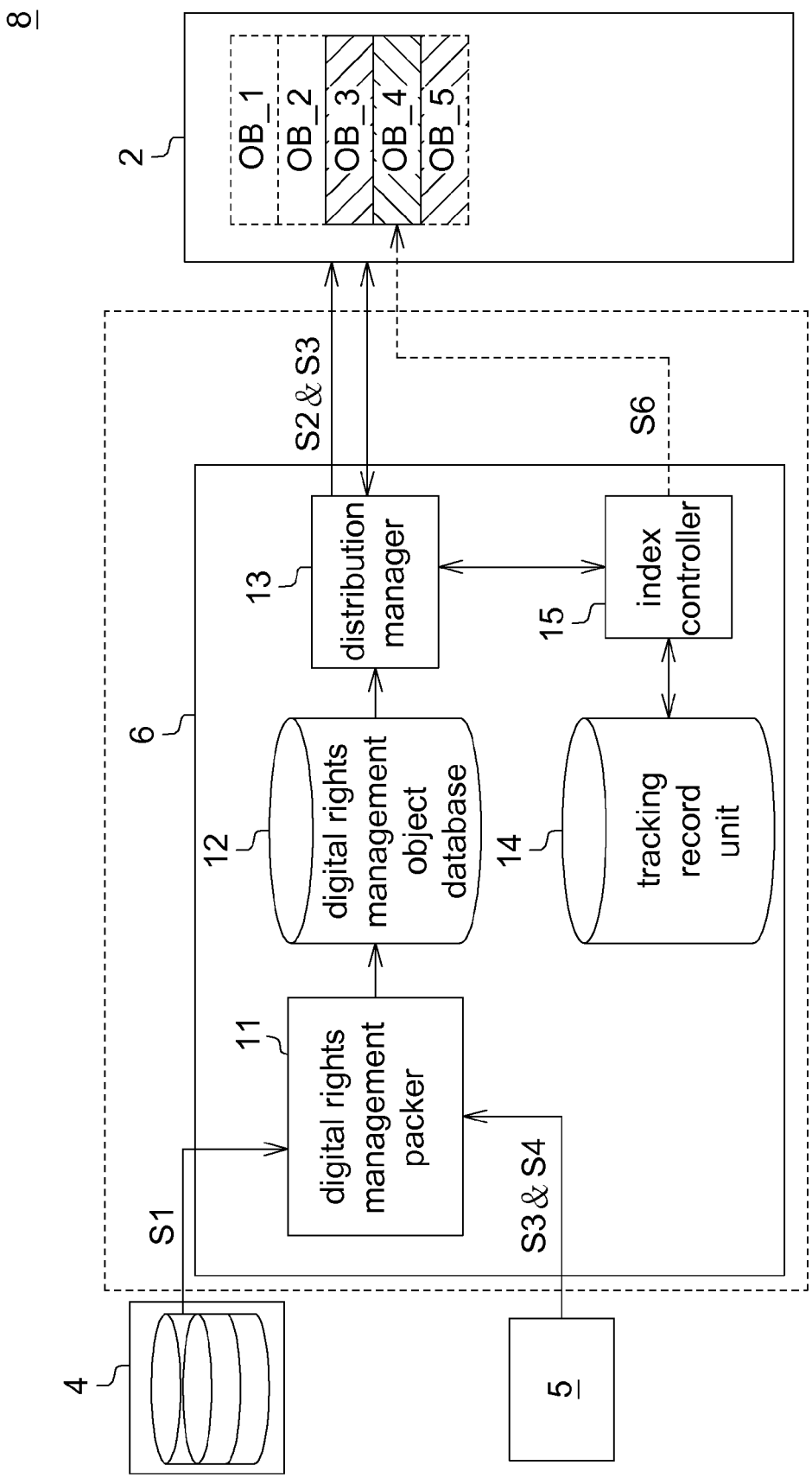
FIG. 6 is a schematic diagram showing a digital rights management system according to a third embodiment.

Referring to FIG. 6, FIG. 6 is a schematic diagram showing a digital rights management system according to the third embodiment of the disclosure. The main difference between the third embodiment and the second embodiment is that is included in the digital rights management packer 11 of the digital rights management system 8 is included in the distribution controller 6 instead of the content issuer 4. However, the digital rights management objects database 12, the digital rights management 13, the tracking record unit 14, and the index controller 15 still are included in a distribution controller 6.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A digital rights management apparatus comprising:
  a memory, a processor coupled to the memory configured to execute programmed instructions stored in the memory comprising:
  generating M content objects according to a digital content and to output M digital rights management objects according to the M content objects, a key datum, and a rights datum, at least segmenting the digital content to generate the M content objects, each of the M content objects comprising a segment of the digital content and at least packing the M content objects with the key datum and the rights datum to output the M digital rights management objects, each of the M digital right management objects comprising a generated M content object, the key datum, and the rights datum;
  selecting corresponding N digital rights management objects from the M digital rights management objects according to request information from a client, wherein N is less than a request upper limit value and the request upper limit value is a maximum quantity of content objects that is allowable for the client to request once, wherein M and N are positive integers and N is less than M;
  obtaining index information, to transmit N content objects to the client according to a tracking record, the index information, a default control rule, and the rights datum, and recording the index information, after the transmission of the N content objects, into the tracking record;
  storing the M digital rights management objects by a digital rights management object database; and
  storing the tracking record by a tracking record unit.

2. The digital rights management apparatus according to claim 1, wherein the processor receives login information and the request information from the client, determines if the client is authorized according to the login information, and, when the client is authorized, finds the corresponding N digital rights management objects from the M digital rights management objects according to the request information so as to select the corresponding N digital rights management objects from the M digital rights management objects.

3. The digital rights management apparatus according to claim 2, wherein when the client is authorized, the processor inspects the tracking record to determine whether the client has downloaded any content object and obtains the index information to determine which content object of the client is pointed to currently.

4. The digital rights management apparatus according to claim 1, wherein the default control rule is that the quantity of the content objects which the client downloads is less than an upper limit value for content objects.

5. The digital rights management apparatus according to claim 1, wherein the default control rule includes a requirement that during a preset period, the quantity of client requesting transmission of the N content objects is less than an upper limit value for client.

6. The digital rights management apparatus according to claim 1, wherein the processor segments the digital content according to an article chapter, an article paragraph, or a graph.

7. The digital rights management apparatus according to claim 1, wherein the processor segments the digital content according to a plurality of graphs or paint frames.

8. The digital rights management apparatus according to claim 1, wherein the M content objects are of different sizes.

9. A digital rights management method, for use in a digital rights management apparatus which includes a digital rights management packer, a digital rights management object database, a distribution manager, a tracking record unit, and an index controller, in which the tracking record unit is for storing a tracking record, the digital rights management method comprising:
  generating, by the digital rights management packer, M content objects according to a digital content by at least segmenting the digital content, each of the M content objects comprising a segment of the digital content and outputting M digital rights management objects according to the M content objects, a key datum, and a rights datum by at least packing the M content objects with the key datum and the rights datum, each of the M digital right management objects comprising a generated M content object, the key datum, and the rights datum;
  storing the M digital rights management objects to the digital rights management object database; selecting corresponding N digital rights management objects from M digital rights management objects according to request information from a client; wherein N is less than a request upper limit value and the request upper limit value is a maximum quantity of content objects that is allowable for the client to request once, wherein M and N are positive integers and N is less than M; and at the index controller: obtaining index information; controlling the distribution manager to transmit N content objects to the client according to the tracking record, the index information, a default control rule, and the rights datum; and recording the index information, after the transmission of the N content objects, into the tracking record.

10. The digital rights management method according to claim 9, wherein the distribution manager receives login information and the request information from the client, determines if the client is authorized according to the login information and finds the corresponding N digital rights management objects from the M digital rights management objects according to the request information and then transmits the request information and the rights datum to the index controller when the client is authorized.

11. The digital rights management method according to claim 10, wherein the index controller inspects the tracking record and obtains the index information.

12. The digital rights management method according to claim 11, wherein the index controller further determines whether to allow the distribution manager to transmit the N content objects according to the request information.

13. The digital rights management method according to claim 9, wherein the default control rule is that the quantity of the content objects which the client downloads is less than an upper limit value for content objects.

14. The digital rights management method according to claim 9, wherein the default control rule includes a requirement that during a preset period, the quantity of the client requesting transmission of N content objects is less than an upper limit value for client.

15. The digital rights management method to claim 9, wherein the digital rights management packer is included in a content issuer and the digital rights management object database, the digital rights management, the tracking record unit, and the index controller are included in a distribution controller.

16. The digital rights management method according to claim 9, wherein the digital rights management packer, the digital rights management object database, the digital rights management, the tracking record unit, and the index controller are included in a distribution controller.

17. The digital rights management method according to claim 9, wherein the digital rights management packer segments the digital content according to an article chapter, an article paragraph, or a plurality of graphs.

18. The digital rights management method according to claim 9, wherein the digital rights management packer segments the digital content according to a plurality of graphs or paint frames.

19. The digital rights management method according to claim 9, wherein the M content objects are of different sizes.

* * * * *